United States Patent
Agarwal et al.

(10) Patent No.: US 12,335,759 B2
(45) Date of Patent: Jun. 17, 2025

(54) BEAM AND SECONDARY COMPONENT CARRIER SELECTION FOR DOWNLINK AND UPLINK

(71) Applicant: QUALCOMM Incorporated, San Diego, CA (US)

(72) Inventors: Rishav Agarwal, Howrah (IN); Vishnu Namboodiri Karakkad Kesavan Namboodiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 18/057,030

(22) Filed: Nov. 18, 2022

(65) Prior Publication Data

US 2024/0172013 A1    May 23, 2024

(51) Int. Cl.
*H04W 24/08*    (2009.01)
*H04L 5/00*    (2006.01)

(52) U.S. Cl.
CPC ............. *H04W 24/08* (2013.01); *H04L 5/001* (2013.01)

(58) Field of Classification Search
CPC ............................. H04W 24/08; H04L 5/001
See application file for complete search history.

(56) References Cited

U.S. PATENT DOCUMENTS

2012/0147772 A1*  6/2012  Kazmi ............... H04W 24/08
                                                          370/252
2013/0051274 A1*  2/2013  Jeong ............... H04W 36/0094
                                                          370/252
2015/0208415 A1*  7/2015  Xu ......................... H04L 1/08
                                                          370/329
2021/0144735 A1    5/2021  Manolakos et al.

OTHER PUBLICATIONS

Intel Corporation: "Summary on SCell BFR and Beam Measurement", 3GPP TSG RAN WG1 Meeting #95, R1-1813978 Summary on Scell BFR and Beam Measurement_R1, 3rd Generation Partnership Project, Mobile Competence Centre, 650, Route Des Lucioles, F-06921 Sophia-Antipolis cedex, France, vol. RAN WG1, No. Spokane, USA, Nov. 12, 2018-Nov. 16, 2018, Nov. 15, 2018, 18 Pages, XP051494428, Sect.s 2.2,3.
International Search Report and Written Opinion—PCT/US2023/077062—ISA/EPO—Feb. 7, 2024.

* cited by examiner

*Primary Examiner* — Brenda H Pham
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may perform first measurements associated with secondary component carriers (SCCs) for downlink and perform second measurements associated with beams. The UE may select a downlink SCC in frequency range 2 (FR2) as a first anchor CC with a primary component carrier (PCC) from frequency range 1 (FR1), from the SCCs for downlink, based on the first measurements, in combination with a downlink beam based on the second measurements. The UE may perform third measurements associated with SCCs for uplink and perform fourth measurements associated with the beams. The UE may select an uplink SCC in FR2 as a second anchor CC with the PCC from FR1, from the SCCs for uplink, based on the third measurements, in combination with an uplink beam based on the fourth measurements. Numerous other aspects are described.

27 Claims, 7 Drawing Sheets

BEAM AND SECONDARY COMPONENT CARRIER SELECTION FOR DOWNLINK AND UPLINK

FIELD OF THE DISCLOSURE

Aspects of the present disclosure generally relate to wireless communication and to techniques and apparatuses for beam and secondary component carrier selection for downlink and uplink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to perform a plurality of first measurements on a corresponding plurality of first reference signals from a network associated with a corresponding plurality of secondary component carriers (SCCs) for downlink. The one or more processors may be configured to perform a plurality of second measurements associated with a corresponding plurality of beams. The one or more processors may be configured to select a downlink SCC in frequency range 2 (FR2) as a first anchor component carrier (CC) with a primary component carrier (PCC) from frequency range 1 (FR1), from the plurality of SCCs for downlink, based at least in part on the plurality of first measurements, in combination with a downlink beam based at least in part on the plurality of second measurements. The one or more processors may be configured to perform a plurality of third measurements on a corresponding plurality of second reference signals from the network associated with a corresponding plurality of SCCs for uplink. The one or more processors may be configured to perform a plurality of fourth measurements associated with the corresponding plurality of beams. The one or more processors may be configured to select an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

Some aspects described herein relate to a method of wireless communication performed by a UE. The method may include performing a plurality of first measurements on a corresponding plurality of first reference signals from a network associated with a corresponding plurality of SCCs for downlink. The method may include performing a plurality of second measurements associated with a corresponding plurality of beams. The method may include selecting a downlink SCC in FR2 as a first anchor CC with a PCC from FR1, from the plurality of SCCs for downlink, based at least in part on the plurality of first measurements, in combination with a downlink beam based at least in part on the plurality of second measurements. The method may include performing a plurality of third measurements on a corresponding plurality of second reference signals from the network associated with a corresponding plurality of SCCs for uplink. The method may include performing a plurality of fourth measurements associated with the corresponding plurality of beams. The method may include selecting an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

Some aspects described herein relate to a non-transitory computer-readable medium that stores a set of instructions for wireless communication by a UE. The set of instructions, when executed by one or more processors of the UE, may cause the UE to perform a plurality of first measurements on a corresponding plurality of first reference signals from a network associated with a corresponding plurality of SCCs for downlink. The set of instructions, when executed by one or more processors of the UE, may cause the UE to perform a plurality of second measurements associated with a corresponding plurality of beams. The set of instructions, when executed by one or more processors of the UE, may cause the UE to select a downlink SCC in FR2 as a first anchor CC with a PCC from FR1, from the plurality of SCCs for downlink, based at least in part on the plurality of first measurements, in combination with a downlink beam based at least in part on the plurality of second measurements. The set of instructions, when executed by one or more processors of the UE, may cause the UE to perform a plurality of third measurements on a corresponding plurality of second reference signals from the network associated with a corresponding plurality of SCCs for uplink. The set of instructions, when executed by one or more processors of the UE, may cause the UE to perform a plurality of fourth measurements associated with the corresponding plurality of beams. The set of instructions, when executed by one or more processors of the UE, may cause the UE to select an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

Some aspects described herein relate to an apparatus for wireless communication. The apparatus may include means for performing a plurality of first measurements on a corresponding plurality of first reference signals from a network associated with a corresponding plurality of SCCs for downlink. The apparatus may include means for performing a plurality of second measurements associated with a corresponding plurality of beams. The apparatus may include means for selecting a downlink SCC in FR2 as a first anchor CC with a PCC from FR1, from the plurality of SCCs for downlink, based at least in part on the plurality of first measurements, in combination with a downlink beam based at least in part on the plurality of second measurements. The apparatus may include means for performing a plurality of third measurements on a corresponding plurality of second reference signals from the network associated with a corresponding plurality of SCCs for uplink. The apparatus may include means for performing a plurality of fourth measurements associated with the corresponding plurality of beams. The apparatus may include means for selecting an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
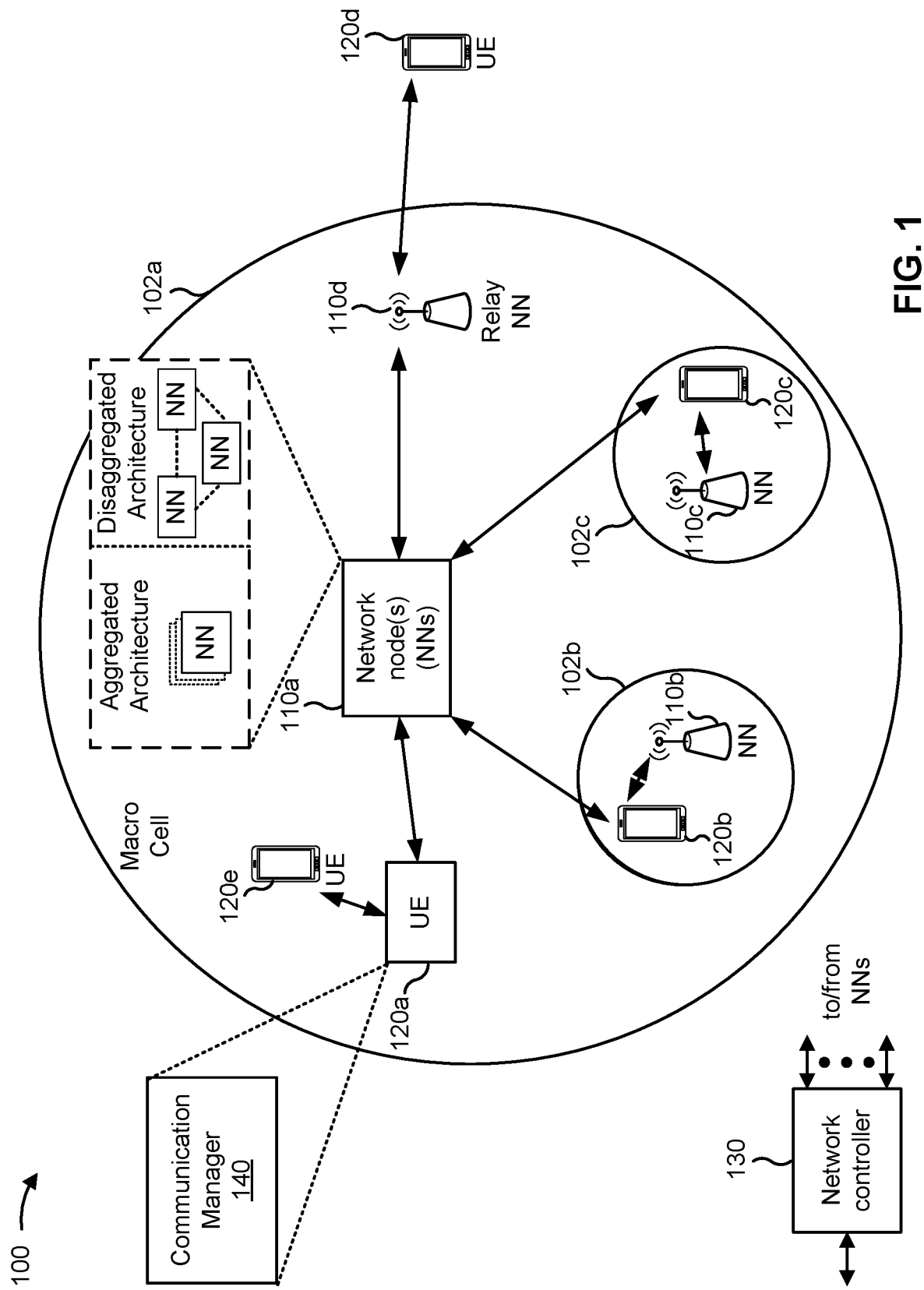
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform a plurality of first measurements on a corresponding plurality of first reference signals from a network associated with a corresponding plurality of secondary component carriers (SCCs) for downlink; perform a plurality of second measurements associated with a corresponding plurality of beams; select a downlink SCC in frequency range 2 (FR2) for as a first anchor component carrier (CC) with a primary component carrier (PCC) from frequency range 1 (FR1), from the plurality of SCCs for downlink, based at least in part on the plurality of first measurements, in combination with a downlink beam based at least in part on the plurality of second measurements; perform a plurality of third measurements on a corresponding plurality of second reference signals from the network associated with a corresponding plurality of SCCs for uplink; perform a plurality of fourth measurements associated with the corresponding plurality of beams; and select an uplink SCC in FR2 as a second anchor CC with the PCC from FR1, from the plurality of SCCs for uplink, based at least in part on the plurality of third measurements, in combination with an uplink beam based at least in part on the plurality of fourth measurements. Additionally, or alternatively, the communication manager 140 may perform one or more other operations described herein.

As indicated above, FIG. 1 is provided as an example. Other examples may differ from what is described with regard to FIG. 1.

Figure 2:
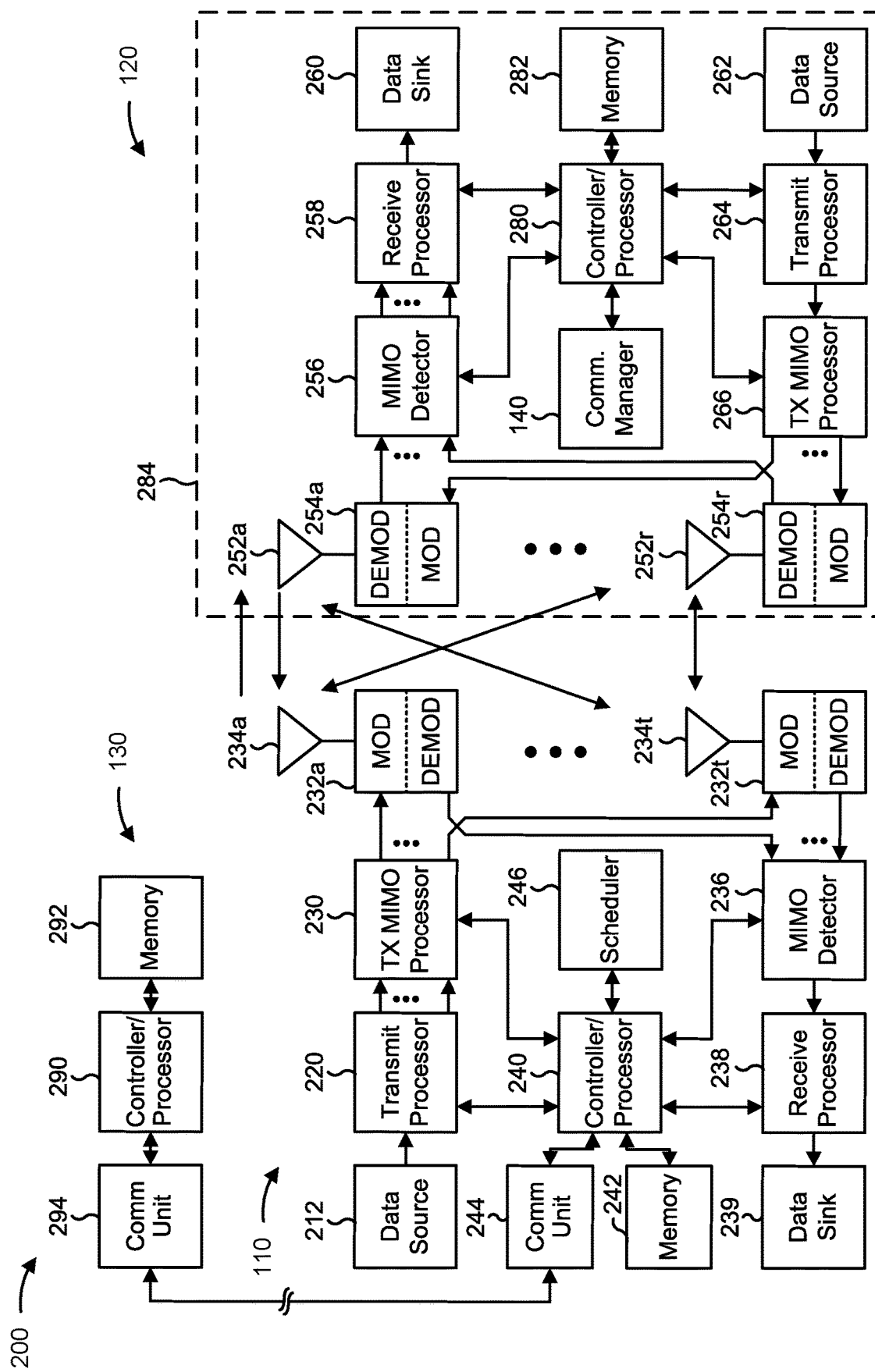
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T>1). The UE 120 may be equipped with a set of antennas 252a through 252r, such as R antennas (R>1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the network node 110, the controller/processor 280 of the UE 120, and/or any other component(s) of FIG. 2 may perform one or more techniques associated with beam and SCC selection for downlink and uplink, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 700 of FIG. 7) may include means for performing a plurality of first measurements on a corresponding plurality of first reference signals from a network associated with a corresponding plurality of SCCs for downlink (e.g., using antenna 252, modem 254, MIMO detector 256, receive processor 258, controller/processor 280, and/or memory 282); means for performing a plurality of second measurements associated with a corresponding plurality of beams (e.g., using antenna 252, modem 254, MIMO detector 256, receive processor 258, controller/processor 280, and/or memory 282); means for selecting a downlink SCC in FR2 as a first anchor CC with a PCC from FR1, from the plurality of SCCs for downlink, based at least in part on the plurality of first measurements, in combination with a downlink beam based at least in part on the plurality of second measurements (e.g., using controller/processor 280 and/or memory 282); means for performing a plurality of third measurements on a corresponding plurality of second reference signals from the network associated with a corresponding plurality of SCCs for uplink (e.g., using antenna 252, modem 254, MIMO detector 256, receive processor 258, controller/processor 280, and/or memory 282); means for performing a plurality of fourth measurements associated with the corresponding plurality of beams (e.g., using antenna 252, modem 254, MIMO detector 256, receive processor 258, controller/processor 280, and/or memory 282); and/or means for selecting an uplink SCC in FR2 as a second anchor CC with the PCC from FR1, from the plurality of SCCs for uplink, based at least in part on the plurality of third measurements, in combination with an uplink beam based at least in part on the plurality of fourth measurements (e.g., using controller/processor 280 and/or memory 282). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
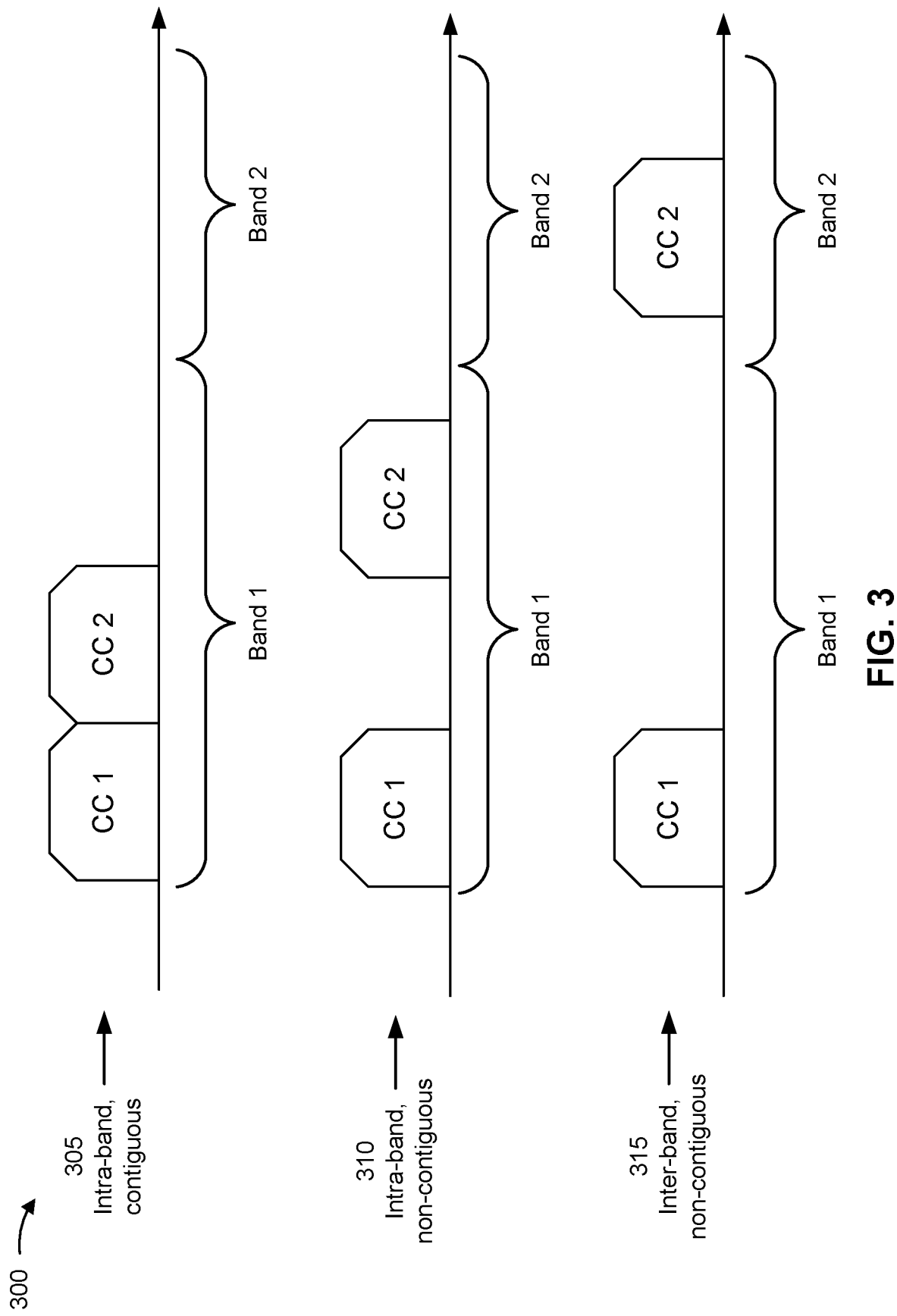
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation (CA) is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, downlink control information (DCI), and/or another signaling message.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

Carrier aggregation (CA) may be performed using a combination of frequencies, such as FR1 in combination with FR2. For example, a primary component carrier (PCC) may be selected on FR1 (e.g., on an LTE network in a non-standalone (NSA) implementation or on a 5G network in a standalone (SA) implementation). Because FR2 is generally associated with higher throughput than FR1, CA using a combination of FR1 and FR2 generally increases throughput to a UE.

To configure CA in a combination of FR1 and FR2, the UE generally selects a secondary component carrier (SCC) in FR2 as an anchor CC. As used herein, "anchor CC" may refer to a CC that controls beam selection and beam refinement (e.g., at the UE). The anchor SCC may function similarly as a PCC. Accordingly, the UE performs beam refinement using the anchor SCC. For example, the UE may select a downlink beam to use with the SCC based on which synchronization signal block (SSB) associated with the SCC has a highest RSRP and/or signal-to-noise ratio (SNR). The UE will then use the downlink beam to receive on the SCC (e.g., by applying a spatial filter to receive). The UE also uses an uplink beam that corresponds to the downlink beam to transmit on the SCC (e.g., by generating wireless signals that are shaped and directed according to the uplink beam).

However, a network may configure some SCCs for downlink only and other SCCs for both downlink and uplink. Accordingly, when the UE selects an SCC for downlink only, the UE will use a different SCC when transmitting to the network. However, because the UE performed beam refinement using the SCC for downlink only, the UE may use a suboptimal beam with the SCC used to transmit to the network. Accordingly, the network may experience reduced quality and reliability of uplink transmissions, which wastes power and processing resources because the UE may increase a transmit power to compensate for the reduced quality and reliability, and the network may apply more filtering to compensate for the reduced quality and reliability. Additionally, the UE may perform more retransmissions to compensate for lost uplink transmissions, which wastes power and processing resources as well. Furthermore, additional retransmissions increase network congestion, which can cause other devices nearby to waste power and processing resources as well.

Some techniques and apparatuses described herein enable a UE (e.g., UE 120 and/or apparatus 700 of FIG. 7) to select an SCC for uplink independently from an SCC for downlink. Accordingly, the UE 120 may select between the SCCs based on data usage (e.g., at a software level, such as an application layer, and/or a hardware level, such as a modem). Alternatively, when the UE 120 is configured for beam decoupling, the UE 120 may use both SCCs. As a result, the UE 120 improves quality and reliability of uplink transmissions to a network (e.g., via a network node 110), which conserves power and processing resources because the UE 120 may decrease a transmit power, and the network may apply less filtering. Additionally, the UE 120 may perform fewer retransmissions, which conserves power and processing resources as well. Furthermore, having fewer retransmissions decreases network congestion, which can cause other devices nearby to conserve power and processing resources as well.

As indicated above, FIG. 3 is provided as an example. Other examples may differ from what is described with regard to FIG. 3.

Figure 4:
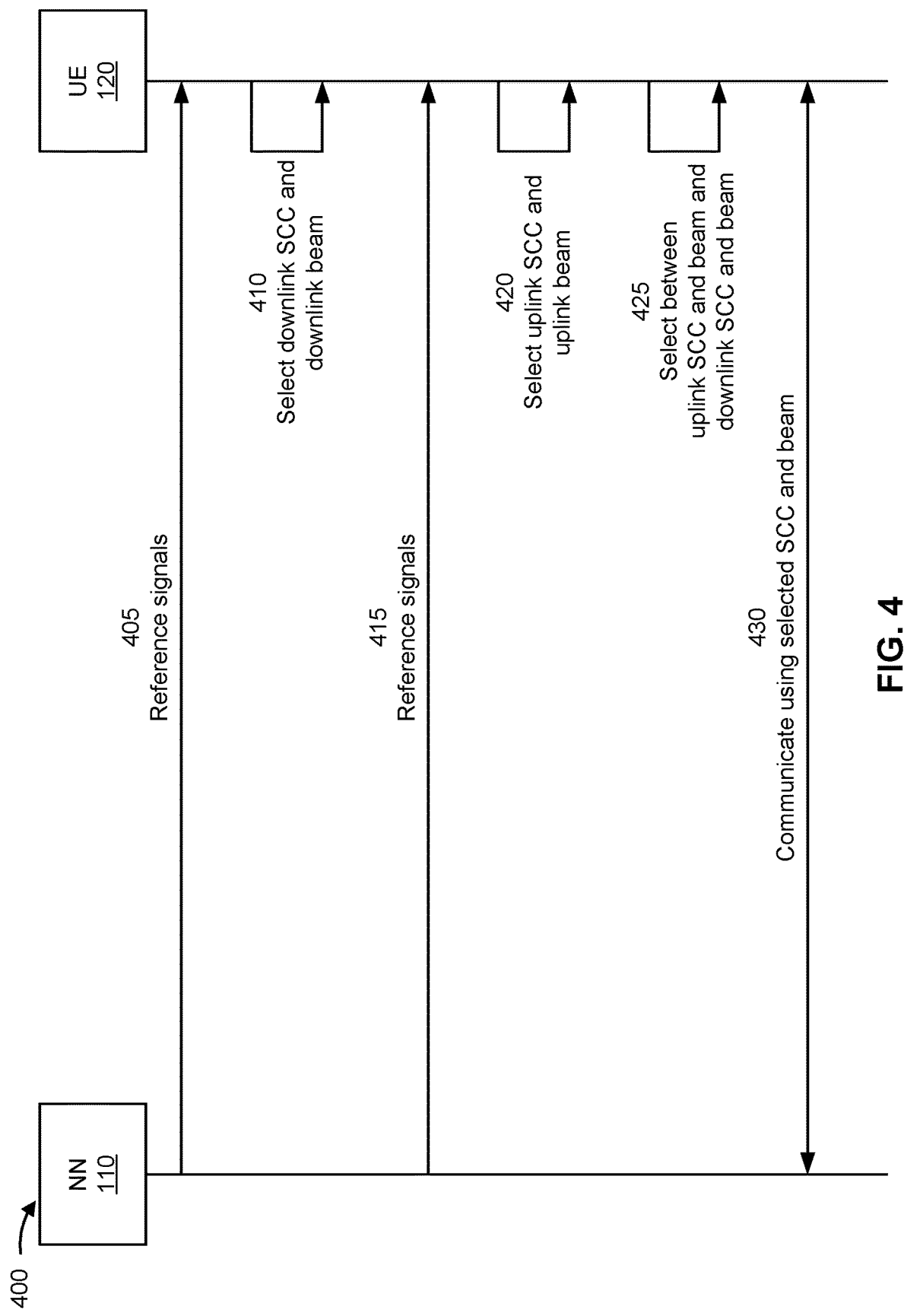
FIGS. 4 and 5 are diagrams illustrating examples associated with beam and secondary component carrier (SCC) selection for downlink and uplink, in accordance with the present disclosure.

FIG. 4 is a diagram illustrating an example 400 associated with beam and SCC selection for downlink and uplink, in accordance with the present disclosure. As shown in FIG. 4, a network node 110 (e.g., an RU and/or a device controlling the RU, such as a CU and/or a DU) and a UE 120 may communicate with one another (e.g., on a wireless network, such as wireless network 100 of FIG. 1).

As shown by reference number 405, the network node 110 may transmit (e.g., directly or via an RU), and the UE 120 may perform first measurements on, a plurality of first reference signals. For example, the network node 110 may broadcast the first reference signals (e.g., SSBs, a tracking reference signal (TRS), and/or another type of broadcast reference signal). Additionally, or alternatively, the network node 110 may unicast (or multicast) the first reference signals (e.g., channel state information reference signals (CSI-RSs) and/or another type of unicast or multicast reference signal).

The first measurements may include layer 1 (L1) measurements, such as RSRP values, SNR values, and/or another value directly measured at a physical (PHY) layer of the UE 120. Additionally, or alternatively, the first measurements may include layer 3 (L3) measurements such as RSRP values, SNR values, and/or another value derived at an RRC layer of the UE 120 using measured values from the PHY layer of the UE 120.

Each of the first reference signals may correspond to an SCC in a plurality of SCCs used by the network node 110. The plurality of SCCs may be configured for downlink. For example, the network node 110 may transmit, and the UE 120 may receive, system information and/or another similar type of message indicating the plurality of SCCs that may be used for downlink.

Additionally, in some aspects, the network node 110 may transmit (e.g., directly or via an RU), and the UE 120 may perform second measurements on, a plurality of reference signals associated with a plurality of beams. For example, the network node 110 may broadcast the reference signals (e.g., SSBs, a TRS, and/or another type of broadcast reference signal). Additionally, or alternatively, the network node 110 may unicast (or multicast) the reference signals (e.g., CSI-RSs and/or another type of unicast or multicast reference signal). The second measurements, similar to the first measurements, may include L1 measurements and/or L3 measurements.

Each reference signal may correspond to a beam in the plurality of beams used by the network node 110. For example, each beam may be associated with a corresponding shape and direction of wireless signals from the network node 110 (or the RU controlled thereby) as well as a corresponding spatial filter (e.g., a receive filter) applied by the UE 120 in order to receive using the beam.

Although described as different reference signals, one or more of the first reference signals may be the same one or more of the reference signals associated with the beams. Additionally, in some aspects, at least one first measurement may be the same as at least one second measurement. Accordingly, the UE 120 may, in some aspects, use one or more same measurements to select from both the plurality of SCCs for downlink and the plurality of beams, as described below.

As shown by reference number 410, the UE 120 may select a downlink SCC (e.g., in FR2 and for CA with a PCC from FR1), from the plurality of SCCs for downlink, based at least in part on the plurality of first measurements. For example, the UE 120 may select the downlink SCC associated with a highest measurement out of the plurality of first measurements. In one example, the UE 120 may select the downlink SCC corresponding to the first reference signal with a highest L3 RSRP value and/or a highest L3 SNR value. The downlink SCC may function as a first anchor CC for use with the PCC.

Additionally, as further shown by reference number 410, the UE 120 may select a downlink beam based at least in part on the plurality of second measurements. For example, the UE 120 may select the downlink beam associated with a highest measurement out of the plurality of second measurements. In one example, the UE 120 may select the downlink beam corresponding to a highest L1 RSRP value and/or a highest L1 SNR value.

As shown by reference number 415, the network node 110 may transmit (e.g., directly or via an RU), and the UE 120 may perform third measurements on, a plurality of second reference signals. For example, the network node 110 may broadcast the second reference signals (e.g., SSBs, a TRS, and/or another type of broadcast reference signal). Additionally, or alternatively, the network node 110 may unicast (or multicast) the second reference signals (e.g., CSI-RSs and/or another type of unicast or multicast reference signal).

The third measurements may include L1 measurements, such as RSRP values, SNR values, and/or another value directly measured at a PHY layer of the UE 120. Additionally, or alternatively, the third measurements may include L3 measurements such as RSRP values, SNR values, and/or another value derived at an RRC layer of the UE 120 using measured values from the PHY layer of the UE 120.

Each of the second reference signals may correspond to an SCC in a plurality of SCCs used by the network node 110. The plurality of SCCs may be configured for uplink. For example, the network node 110 may transmit, and the UE 120 may receive, system information and/or another similar type of message indicating the plurality of SCCs that may be used for uplink.

Additionally, in some aspects, the network node 110 may transmit (e.g., directly or via an RU), and the UE 120 may perform fourth measurements on, a plurality of reference signals associated with the plurality of beams. For example, the network node 110 may broadcast the reference signals (e.g., SSBs, a TRS, and/or another type of broadcast reference signal). Additionally, or alternatively, the network node 110 may unicast (or multicast) the reference signals (e.g., CSI-RSs and/or another type of unicast or multicast reference signal). The fourth measurements, similar to the third measurements, may include L1 measurements and/or L3 measurements.

Each reference signal may correspond to a beam in the plurality of beams used by the network node 110. For example, each beam may be associated with a corresponding shape and direction of wireless signals from the network node 110 (or the RU controlled thereby) as well as a corresponding spatial filter (e.g., a receive filter) applied by the UE 120 in order to receive using the beam.

Although described as different reference signals, one or more of the second reference signals may be the same one or more of the reference signals associated with the beams. Additionally, in some aspects, at least one third measurement may be the same as at least one fourth measurement. Accordingly, the UE 120 may, in some aspects, use one or more same measurements to select from both the plurality of SCCs for uplink and the plurality of beams, as described below.

As shown by reference number 420, the UE 120 may select an uplink SCC (e.g., in FR2 and for CA with a PCC from FR1), from the plurality of SCCs for uplink, based at least in part on the plurality of third measurements. For example, the UE 120 may select the uplink SCC associated with a highest measurement out of the plurality of third measurements. In one example, the UE 120 may select the uplink SCC corresponding to the third reference signal with a highest L3 RSRP value and/or a highest L3 SNR value. The uplink SCC may function as a second anchor CC for use with the PCC.

Additionally, as further shown by reference number 420, the UE 120 may select an uplink beam based at least in part on the plurality of fourth measurements. For example, the UE 120 may select the uplink beam associated with a highest measurement out of the plurality of fourth measurements. In one example, the UE 120 may select the uplink beam corresponding to a highest L1 RSRP value and/or a highest L1 SNR value.

As shown by reference number 425, the UE 120 may select the uplink SCC and beam or the downlink SCC and beam for communications with the network node 110. For example, the UE 120 may apply original equipment manufacturing (OEM) rules to determine whether to prioritize downlink or uplink. Additionally, or alternatively, the UE 120 may determine whether to prioritize downlink or uplink based at least in part on one or more key performance indicators (KPIs) from a modem of the UE 120 (e.g., a buffer status report (BSR) index, a quantity of MIMO layers, and/or another KPI). Accordingly, the UE 120 may select the downlink SCC and beam when expecting data from the network node 110 that satisfies a downlink size threshold and/or when expected data for transmitting to the network node 110 fails to satisfy an uplink size threshold. Similarly, the UE 120 may select the uplink SCC and beam when expecting data from the network node 110 that fails to satisfy a downlink size threshold and/or when expected data for transmitting to the network node 110 satisfies an uplink size threshold.

Accordingly, as shown by reference number 430, the UE 120 may communicate with the network node 110 (e.g., by receiving from and/or transmitting to the network node 110, whether directly or via the RU) using the selected SCC and the selected beam. Additionally, in some aspects, the UE 120 may perform beam refinement for the downlink beam in a first SSB occasion and may perform beam refinement for the uplink beam in a second SSB occasion. For example, the UE 120 may select a subbeam, from a plurality of subbeams included in the downlink beam, based on measurements associated with the plurality of subbeams (e.g., similar to selecting the downlink beam, as described above). Similarly, the UE 120 may select a subbeam, from a plurality of subbeams included in the uplink beam, based on measurements associated with the plurality of subbeams (e.g., similar to selecting the uplink beam, as described above). Because the UE 120 uses the downlink beam and the uplink beam independently, the UE 120 may refine the beams in separate SSB occasions.

By using techniques as described in connection with FIG. 4, the UE 120 may switch between the downlink beam and the uplink beam depending on which direction is associated with a larger data flow. As a result, the UE 120 improves quality and reliability of communications with the network node 110, which conserves power and processing resources because the UE 120 may decrease a transmit power (when the uplink beam is selected) or may apply less filtering (when the downlink beam is selected), and the network node 110 (or the RU controlled thereby) may decrease a transmit power (when the downlink beam is selected) or may apply less filtering (when the uplink beam is selected). Additionally, the UE 120 and/or the network node 110 may perform fewer retransmissions, which conserves power and processing resources as well. Furthermore, having fewer retransmissions decreases network congestion, which can cause other devices nearby to conserve power and processing resources as well.

As indicated above, FIG. 4 is provided as an example. Other examples may differ from what is described with respect to FIG. 4.

Figure 5:
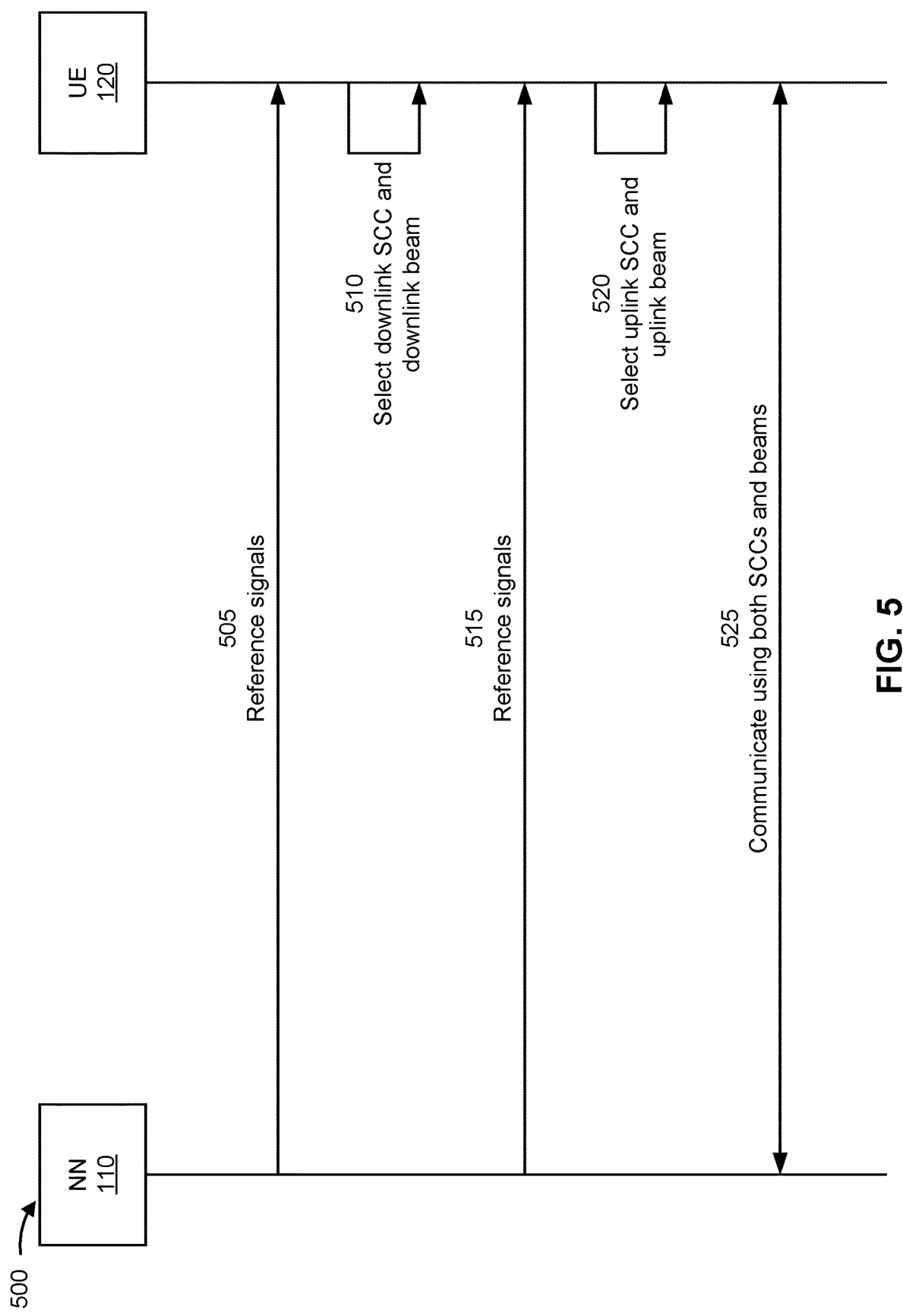

FIG. 5 is a diagram illustrating an example 500 associated with beam and SCC selection for downlink and uplink, in accordance with the present disclosure. As shown in FIG. 5, a network node 110 (e.g., an RU and/or a device controlling the RU, such as a CU and/or a DU) and a UE 120 may communicate with one another (e.g., on a wireless network, such as wireless network 100 of FIG. 1).

As shown by reference number 505, the network node 110 may transmit (e.g., directly or via an RU), and the UE 120 may perform first measurements on, a plurality of first reference signals, as described in connection with reference number 405 of FIG. 4. Additionally, in some aspects, the network node 110 may transmit (e.g., directly or via an RU), and the UE 120 may perform second measurements on, a plurality of reference signals associated with a plurality of beams, as described in connection with FIG. 4.

As shown by reference number 510, the UE 120 may select a downlink SCC (e.g., in FR2 and for CA with a PCC from FR1), from the plurality of SCCs for downlink, based at least in part on the plurality of first measurements. For example, the UE 120 may select the downlink SCC associated with a highest measurement out of the plurality of first measurements. In one example, the UE 120 may select the downlink SCC corresponding to the first reference signal with a highest L3 RSRP value and/or a highest L3 SNR value. The downlink SCC may function as a first anchor CC for use with the PCC.

Additionally, as further shown by reference number 510, the UE 120 may select a downlink beam based at least in part on the plurality of second measurements. For example, the UE 120 may select the downlink beam associated with a highest measurement out of the plurality of second measurements. In one example, the UE 120 may select the downlink beam corresponding to a highest L1 RSRP value and/or a highest L1 SNR value.

As shown by reference number 515, the network node 110 may transmit (e.g., directly or via an RU), and the UE 120 may perform third measurements on, a plurality of second reference signals, as described in connection with reference number 415 of FIG. 4. Additionally, in some aspects, the network node 110 may transmit (e.g., directly or via an RU), and the UE 120 may perform fourth measurements on, a plurality of reference signals associated with the plurality of beams, as described in connection with FIG. 4.

As shown by reference number 520, the UE 120 may select an uplink SCC (e.g., in FR2 and for CA with a PCC from FR1), from the plurality of SCCs for uplink, based at least in part on the plurality of third measurements. For example, the UE 120 may select the uplink SCC associated with a highest measurement out of the plurality of third measurements. In one example, the UE 120 may select the uplink SCC corresponding to the third reference signal with a highest L3 RSRP value and/or a highest L3 SNR value. The uplink SCC may function as a second anchor CC for use with the PCC.

Additionally, as further shown by reference number 520, the UE 120 may select an uplink beam based at least in part on the plurality of fourth measurements. For example, the UE 120 may select the uplink beam associated with a highest measurement out of the plurality of fourth measurements. In one example, the UE 120 may select the uplink beam corresponding to a highest L1 RSRP value and/or a highest L1 SNR value.

As shown by reference number 525, the UE 120 may communicate with the network node 110. For example, the UE 120 may receive from the network node 110 (whether directly or via the RU) using the downlink SCC and the downlink beam and may transmit to the network node 110 (whether directly or via the RU) using the uplink SCC and the uplink beam.

Additionally, the UE 120 may perform beam refinement for the downlink beam and the uplink beam. For example, the UE 120 may select a subbeam, from a plurality of subbeams included in the downlink beam, based on measurements associated with the plurality of subbeams (e.g., similar to selecting the downlink beam, as described above). Similarly, the UE 120 may select a subbeam, from a plurality of subbeams included in the uplink beam, based on measurements associated with the plurality of subbeams (e.g., similar to selecting the uplink beam, as described above). Because the UE 120 is configured for beam decoupling, the UE 120 may refine the beams simultaneously (e.g., using measurements in same SSB occasions).

By using techniques as described in connection with FIG. 5, the UE 120 uses optimal beams for both uplink and downlink. As a result, the UE 120 improves quality and reliability of communications with the network node 110, which conserves power and processing resources because the UE 120 may decrease a transmit power (for uplink) and apply less filtering (for downlink), and the network node 110 (or the RU controlled thereby) may decrease a transmit power (for downlink) and apply less filtering (for uplink). Additionally, the UE 120 and the network node 110 may perform fewer retransmissions, which conserves power and processing resources as well. Furthermore, fewer retransmissions decrease network congestion, which can cause other devices nearby to conserve power and processing resources as well.

As indicated above, FIG. 5 is provided as an example. Other examples may differ from what is described with respect to FIG. 5.

Figure 6:
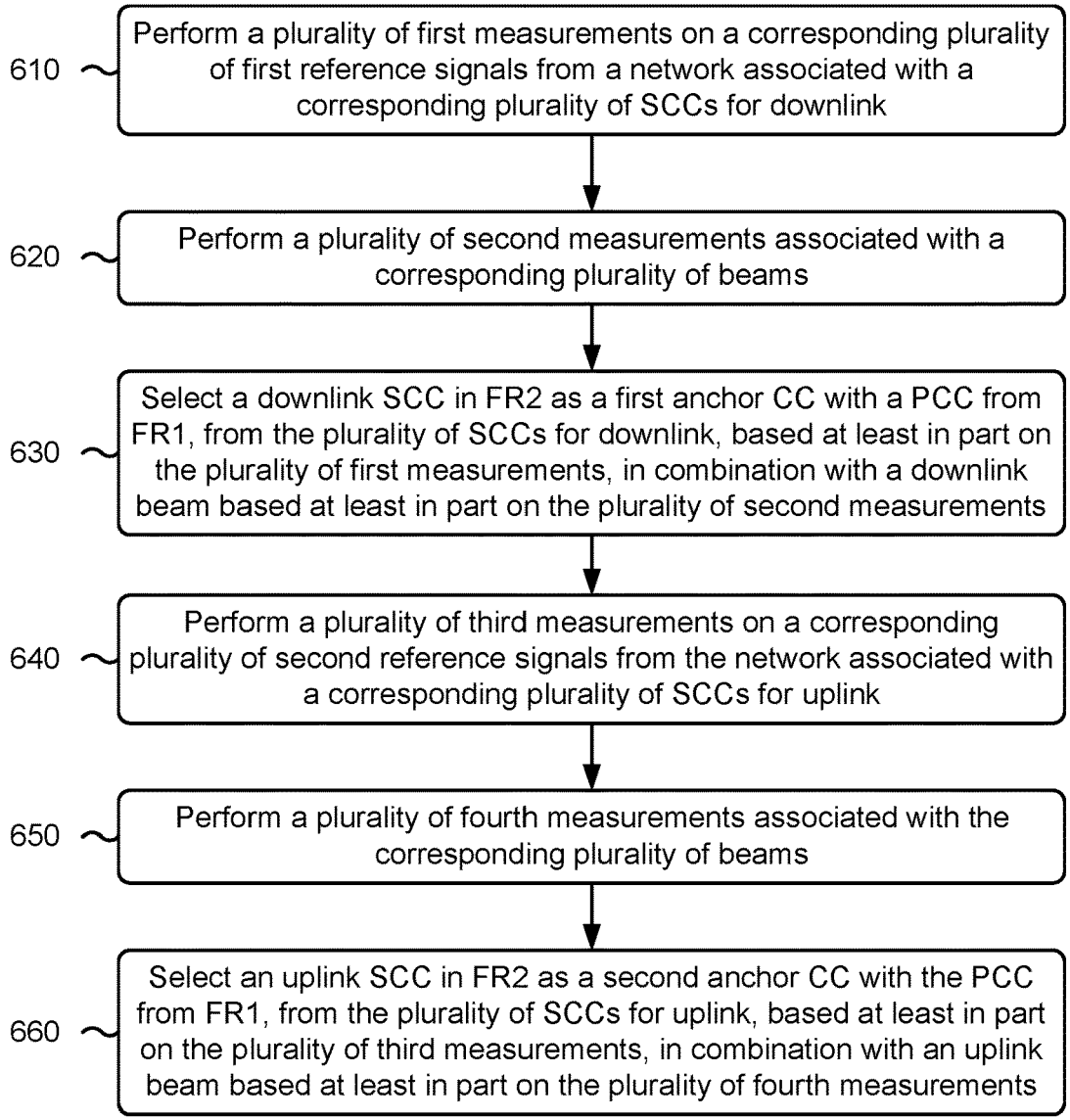
FIG. 6 is a diagram illustrating an example process associated with beam and SCC selection for downlink and uplink, in accordance with the present disclosure.

FIG. 6 is a diagram illustrating an example process 600 performed, for example, by a UE, in accordance with the present disclosure. Example process 600 is an example where the UE (e.g., UE 120) performs operations associated with beam and SCC selection for downlink and uplink.

As shown in FIG. 6, in some aspects, process 600 may include performing a plurality of first measurements on a corresponding plurality of first reference signals from a network associated with a corresponding plurality of SCCs for downlink (block 610). For example, the UE (e.g., using communication manager 140 and/or measurement component 708, depicted in FIG. 7) may perform a plurality of first measurements on a corresponding plurality of first reference signals from a network associated with a corresponding plurality of SCCs for downlink, as described above, for example, with reference to FIGS. 4 and/or 5.

As further shown in FIG. 6, in some aspects, process 600 may include performing a plurality of second measurements associated with a corresponding plurality of beams (block 620). For example, the UE (e.g., using communication manager 140 and/or measurement component 708) may perform a plurality of second measurements associated with a corresponding plurality of beams, as described above, for example, with reference to FIGS. 4 and/or 5.

As further shown in FIG. 6, in some aspects, process 600 may include selecting a downlink SCC in FR2 as a first anchor CC with a PCC from FR1, from the plurality of SCCs for downlink, based at least in part on the plurality of first measurements, in combination with a downlink beam based at least in part on the plurality of second measurements (block 630). For example, the UE (e.g., using communication manager 140 and/or determination component 710, depicted in FIG. 7) may select a downlink SCC in FR2 as a first anchor CC with a PCC from FR1, from the plurality of SCCs for downlink, based at least in part on the plurality of first measurements, in combination with a downlink beam based at least in part on the plurality of second measurements, as described above, for example, with reference to FIGS. 4 and/or 5.

As further shown in FIG. 6, in some aspects, process 600 may include performing a plurality of third measurements on a corresponding plurality of second reference signals from the network associated with a corresponding plurality of SCCs for uplink (block 640). For example, the UE (e.g., using communication manager 140 and/or measurement component 708) may perform a plurality of third measurements on a corresponding plurality of second reference signals from the network associated with a corresponding plurality of SCCs for uplink, as described above, for example, with reference to FIGS. 4 and/or 5.

As further shown in FIG. 6, in some aspects, process 600 may include performing a plurality of fourth measurements associated with the corresponding plurality of beams (block 650). For example, the UE (e.g., using communication manager 140 and/or measurement component 708) may perform a plurality of fourth measurements associated with the corresponding plurality of beams, as described above, for example, with reference to FIGS. 4 and/or 5.

As further shown in FIG. 6, in some aspects, process 600 may include selecting an uplink SCC in FR2 as a second anchor CC with the PCC from FR1, from the plurality of SCCs for uplink, based at least in part on the plurality of third measurements, in combination with an uplink beam based at least in part on the plurality of fourth measurements (block 660). For example, the UE (e.g., using communication manager 140 and/or determination component 710) may select an uplink SCC in FR2 as a second anchor CC with the PCC from FR1, from the plurality of SCCs for uplink, based at least in part on the plurality of third measurements, in combination with an uplink beam based at least in part on the plurality of fourth measurements, as described above, for example, with reference to FIGS. 4 and/or 5.

Process 600 may include additional aspects, such as any single aspect or any combination of aspects described below and/or in connection with one or more other processes described elsewhere herein.

In a first aspect, the plurality of first measurements include L3 measurements.

In a second aspect, alone or in combination with the first aspect, the plurality of third measurements include L3 measurements.

In a third aspect, alone or in combination with one or more of the first and second aspects, the plurality of first measurements include L1 measurements.

In a fourth aspect, alone or in combination with one or more of the first through third aspects, the plurality of third measurements include L1 measurements.

In a fifth aspect, alone or in combination with one or more of the first through fourth aspects, process 600 includes performing beam refinement (e.g., using communication manager 140 and/or measurement component 708) for the downlink beam in a first SSB occasion and performing beam refinement (using communication manager 140 and/or measurement component 708) for the uplink beam in a second SSB occasion.

Figure 7:
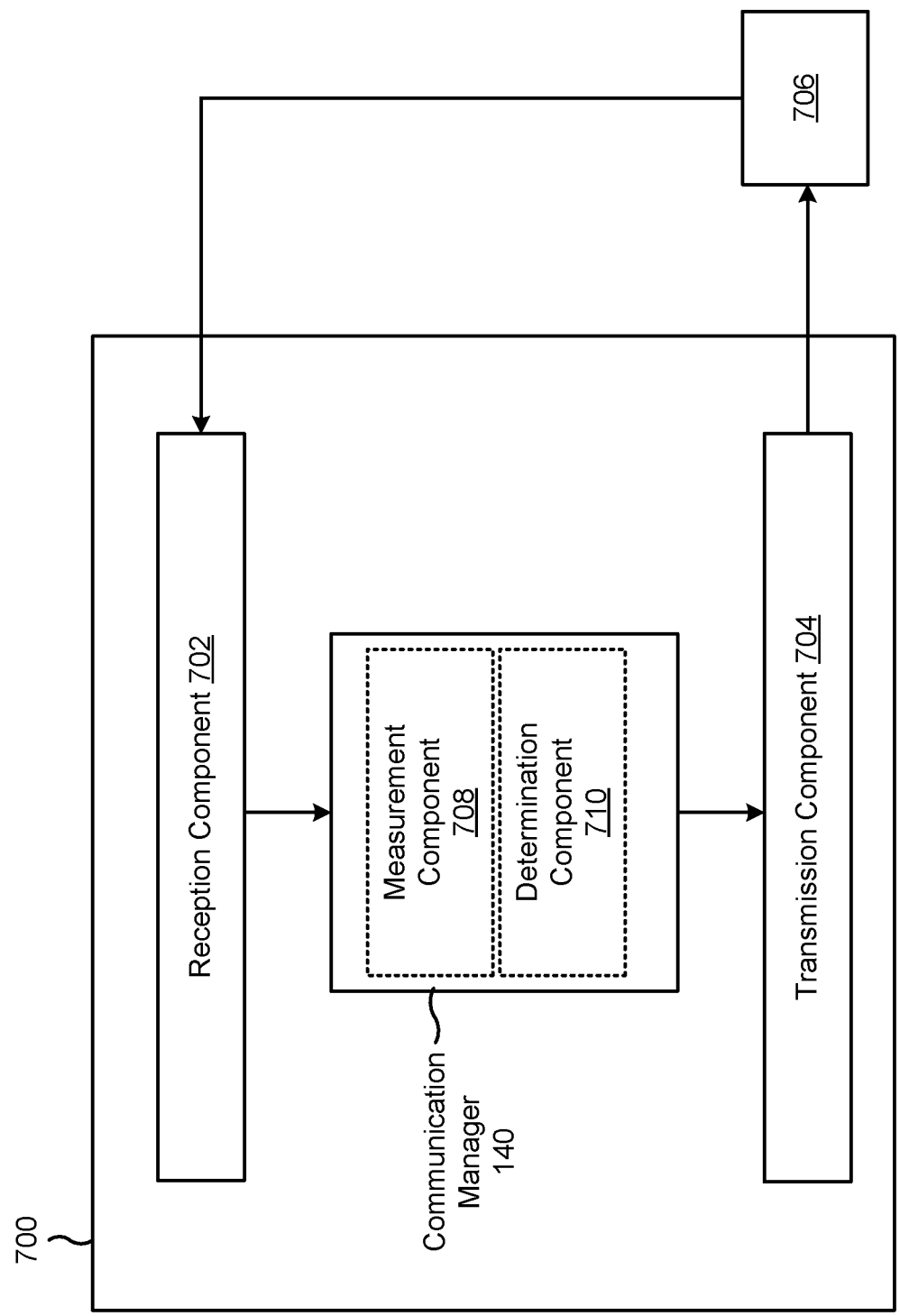
FIG. 7 is a diagram of an example apparatus for wireless communication, in accordance with the present disclosure.

In a sixth aspect, alone or in combination with one or more of the first through fifth aspects, process 600 includes selecting the uplink beam or the downlink beam for communications (e.g., using communication manager 140, reception component 702, and/or transmission component 704, depicted in FIG. 7) with the network.

In a seventh aspect, alone or in combination with one or more of the first through sixth aspects, process 600 includes performing beam refinement (e.g., using communication manager 140 and/or measurement component 708) for the downlink beam and the uplink beam.

In an eighth aspect, alone or in combination with one or more of the first through seventh aspects, process 600 includes transmitting (e.g., using communication manager 140 and/or transmission component 704) to the network using the uplink beam on the uplink SCC and receiving (using communication manager 140 and/or reception component 702) from the network using the downlink beam on the downlink SCC.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, an RU, or another wireless communication device) using the reception component 702 and the transmission component 704. As further shown, the apparatus 700 may include the communication manager 140. The communication manager 140 may include one or more of a measurement component 708 and/or a determination component 710, among other examples.

In some aspects, the apparatus 700 may be configured to perform one or more operations described herein in connection with FIGS. 4-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

In some aspects, the measurement component 708 may perform a plurality of first measurements on a corresponding plurality of first reference signals from a network (e.g., from the apparatus 706 in the network) associated with a corresponding plurality of SCCs for downlink. The measurement component 708 may include one or more antennas, a modem, a demodulator, a MIMO detector, a receive processor, a controller/processor, a memory, or a combination thereof, of the UE described in connection with FIG. 2. The measurement component 708 may perform a plurality of second measurements associated with a corresponding plurality of beams. Accordingly, the determination component 710 may select a downlink SCC in FR2 as a first anchor CC with a PCC from FR1, from the plurality of SCCs for downlink, based at least in part on the plurality of first measurements, in combination with a downlink beam based at least in part on the plurality of second measurements. The determination component 710 may include a transmit processor, a receive processor, a controller/processor, a memory, or a combination thereof, of the UE described in connection with FIG. 2.

The measurement component 708 may further perform a plurality of third measurements on a corresponding plurality of second reference signals from the network associated with a corresponding plurality of SCCs for uplink. The measurement component 708 may perform a plurality of fourth measurements associated with the corresponding plurality of beams. Accordingly, the determination component 710 may select an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

In some aspects, the measurement component 708 may perform beam refinement for the downlink beam in a first SSB occasion and perform beam refinement for the uplink beam in a second SSB occasion. Alternatively, the measurement component 708 may perform beam refinement for the downlink beam and the uplink beam (e.g., simultaneously).

In some aspects, the determination component 710 may select the uplink beam or the downlink beam for communications with the network. Alternatively, the transmission component 704 may transmit to the network using the uplink beam on the uplink SCC, and the reception component 702 may receive from the network using the downlink beam on the downlink SCC.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: performing a plurality of first measurements on a corresponding plurality of first reference signals from a network associated with a corresponding plurality of secondary component carriers (SCCs) for downlink; performing a plurality of second measurements associated with a corresponding plurality of beams; selecting a downlink SCC in frequency range 2 (FR2) as a first anchor component carrier (CC) with a primary component carrier (PCC) from frequency range 1 (FR1), from the plurality of SCCs for downlink, based at least in part on the plurality of first measurements, in combination with a downlink beam based at least in part on the plurality of second measurements; performing a plurality of third measurements on a corresponding plurality of second reference signals from the network associated with a corresponding plurality of SCCs for uplink; performing a plurality of fourth measurements associated with the corresponding plurality of beams; and selecting an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

Aspect 2: The method of Aspect 1, further comprising: performing beam refinement for the downlink beam in a first synchronization signal block (SSB) occasion; and performing beam refinement for the uplink beam in a second SSB occasion.

Aspect 3: The method of Aspect 1 or Aspect 2, further comprising: selecting the uplink beam or the downlink beam for communications with the network.

Aspect 4: The method of Aspect 1, further comprising: performing beam refinement for the downlink beam and the uplink beam.

Aspect 5: The method of Aspect 1 or Aspect 4, further comprising: transmitting to the network using the uplink beam on the uplink SCC; and receiving from the network using the downlink beam on the downlink SCC.

Aspect 6: The method of any of Aspects 1 through 5, wherein the plurality of first measurements include layer 3 measurements.

Aspect 7: The method of any of Aspects 1 through 6, wherein the plurality of third measurements include layer 3 measurements.

Aspect 8: The method of any of Aspects 1 through 7, wherein the plurality of first measurements include layer 1 measurements.

Aspect 9: The method of any of Aspects 1 through 8, wherein the plurality of third measurements include layer 1 measurements.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        perform a plurality of first measurements on a corresponding plurality of first reference signals from a network associated with a corresponding plurality of secondary component carriers (SCCs) for downlink;
        perform a plurality of second measurements associated with a corresponding plurality of beams;
        select a downlink SCC in frequency range 2 (FR2) as a first anchor component carrier (CC) with a primary component carrier (PCC) from frequency range 1 (FR1), from the plurality of SCCs for downlink, based at least in part on the plurality of first measurements, in combination with a downlink beam based at least in part on the plurality of second measurements;
        perform a plurality of third measurements on a corresponding plurality of second reference signals from the network associated with a corresponding plurality of SCCs for uplink;
        perform a plurality of fourth measurements associated with the corresponding plurality of beams; and
        select an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

2. The apparatus of claim 1, wherein the plurality of first measurements include layer 3 measurements.

3. The apparatus of claim 1, wherein the plurality of third measurements include layer 3 measurements.

4. The apparatus of claim 1, wherein the plurality of first measurements include layer 1 measurements.

5. The apparatus of claim 1, wherein the plurality of third measurements include layer 1 measurements.

6. The apparatus of claim 1, wherein the one or more processors are further configured to:
    perform beam refinement for the downlink beam in a first synchronization signal block (SSB) occasion; and
    perform beam refinement for the uplink beam in a second SSB occasion.

7. The apparatus of claim 1, wherein the one or more processors are further configured to:
    select the uplink beam or the downlink beam for communications with the network.

8. The apparatus of claim 1, wherein the one or more processors are further configured to:
    perform beam refinement for the downlink beam and the uplink beam.

9. The apparatus of claim 1, wherein the one or more processors are further configured to:
    transmit to the network using the uplink beam on the uplink SCC; and
    receive from the network using the downlink beam on the downlink SCC.

10. A method of wireless communication performed by a user equipment (UE), comprising:
    performing a plurality of first measurements on a corresponding plurality of first reference signals from a network associated with a corresponding plurality of secondary component carriers (SCCs) for downlink;
    performing a plurality of second measurements associated with a corresponding plurality of beams;
    selecting a downlink SCC in frequency range 2 (FR2) as a first anchor component carrier (CC) with a primary component carrier (PCC) from frequency range 1 (FR1), from the plurality of SCCs for downlink, based at least in part on the plurality of first measurements, in combination with a downlink beam based at least in part on the plurality of second measurements;
    performing a plurality of third measurements on a corresponding plurality of second reference signals from the network associated with a corresponding plurality of SCCs for uplink;

performing a plurality of fourth measurements associated with the corresponding plurality of beams; and selecting an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

11. The method of claim 10, wherein the plurality of first measurements include layer 3 measurements.

12. The method of claim 10, wherein the plurality of third measurements include layer 3 measurements.

13. The method of claim 10, wherein the plurality of first measurements include layer 1 measurements.

14. The method of claim 10, wherein the plurality of third measurements include layer 1 measurements.

15. The method of claim 10, further comprising:
performing beam refinement for the downlink beam in a first synchronization signal block (SSB) occasion; and
performing beam refinement for the uplink beam in a second SSB occasion.

16. The method of claim 10, further comprising:
selecting the uplink beam or the downlink beam for communications with the network.

17. The method of claim 10, further comprising:
performing beam refinement for the downlink beam and the uplink beam.

18. The method of claim 10, further comprising:
transmitting to the network using the uplink beam on the uplink SCC; and
receiving from the network using the downlink beam on the downlink SCC.

19. A non-transitory computer-readable medium storing a set of instructions for wireless communication, the set of instructions comprising:
one or more instructions that, when executed by one or more processors of a user equipment (UE), cause the UE to:
perform a plurality of first measurements on a corresponding plurality of first reference signals from a network associated with a corresponding plurality of secondary component carriers (SCCs) for downlink;
perform a plurality of second measurements associated with a corresponding plurality of beams;
select a downlink SCC in frequency range 2 (FR2) as a first anchor component carrier (CC) with a primary component carrier (PCC) from frequency range 1 (FR1), from the plurality of SCCs for downlink, based at least in part on the plurality of first measurements, in combination with a downlink beam based at least in part on the plurality of second measurements;
perform a plurality of third measurements on a corresponding plurality of second reference signals from the network associated with a corresponding plurality of SCCs for uplink;
perform a plurality of fourth measurements associated with the corresponding plurality of beams; and
select an uplink SCC in FR2 as a second anchor CC with the PCC from FR1, from the plurality of SCCs for uplink, based at least in part on the plurality of third measurements, in combination with an uplink beam based at least in part on the plurality of fourth measurements.

20. The non-transitory computer-readable medium of claim 19, wherein the plurality of first measurements include layer 3 measurements.

21. The non-transitory computer-readable medium of claim 19, wherein the plurality of third measurements include layer 3 measurements.

22. The non-transitory computer-readable medium of claim 19, wherein the plurality of first measurements include layer 1 measurements.

23. The non-transitory computer-readable medium of claim 19, wherein the plurality of third measurements include layer 1 measurements.

24. The non-transitory computer-readable medium of claim 19, wherein the one or more instructions further cause the UE to:
perform beam refinement for the downlink beam in a first synchronization signal block (SSB) occasion; and
perform beam refinement for the uplink beam in a second SSB occasion.

25. The non-transitory computer-readable medium of claim 19, wherein the one or more instructions further cause the UE to:
select the uplink beam or the downlink beam for communications with the network.

26. The non-transitory computer-readable medium of claim 19, wherein the one or more instructions further cause the UE to:
perform beam refinement for the downlink beam and the uplink beam.

27. The non-transitory computer-readable medium of claim 19, wherein the one or more instructions further cause the UE to:
transmit to the network using the uplink beam on the uplink SCC; and
receive from the network using the downlink beam on the downlink SCC.

* * * * *